United States Patent
Wible

[19]

[11] Patent Number: 5,913,250

[45] Date of Patent: Jun. 15, 1999

[54] PRESSURE COMPENSATED THERMAL FLOW METER

[75] Inventor: Eric Wible, Encinitas, Calif.

[73] Assignee: Fluid Components Intl, San Marcos, Calif.

[21] Appl. No.: 08/960,171

[22] Filed: Oct. 29, 1997

[51] Int. Cl.[6] .................................................. G01F 1/46
[52] U.S. Cl. ........................................................ 73/861.65
[58] Field of Search ........................... 73/861.65, 204.22, 73/204, 204.21

[56] References Cited

U.S. PATENT DOCUMENTS

| | | | |
|---|---|---|---|
| 3,366,942 | 1/1968 | Deane | 340/243 |
| 3,677,079 | 7/1972 | Hoeflinger | 73/147 |
| 3,927,567 | 12/1975 | Novak et al. | 73/204 |
| 4,545,260 | 10/1985 | Benton et al. | 73/861.65 |
| 4,561,302 | 12/1985 | Sumal et al. | 73/202 |
| 4,783,994 | 11/1988 | Ashby, Jr. | 73/147 |
| 4,899,584 | 2/1990 | McQueen | 73/204.21 |
| 5,780,737 | 7/1998 | Wible et al. | 73/204.22 |
| 5,811,691 | 9/1998 | Jackson | 73/861.65 |

Primary Examiner—George Dombroske
Assistant Examiner—Jewel V. Thompson
Attorney, Agent, or Firm—Baker & Maxham

[57] ABSTRACT

A flow meter having reference and active thermal sensing elements and a pressure transducer configured to be placed in a conduit of flowing fluid. Appropriate computation apparatus is employed to modify the flow velocity reading resulting from normal comparison of the thermal sensors in accordance with pressure differences reflected by the pressure transducer.

10 Claims, 6 Drawing Sheets

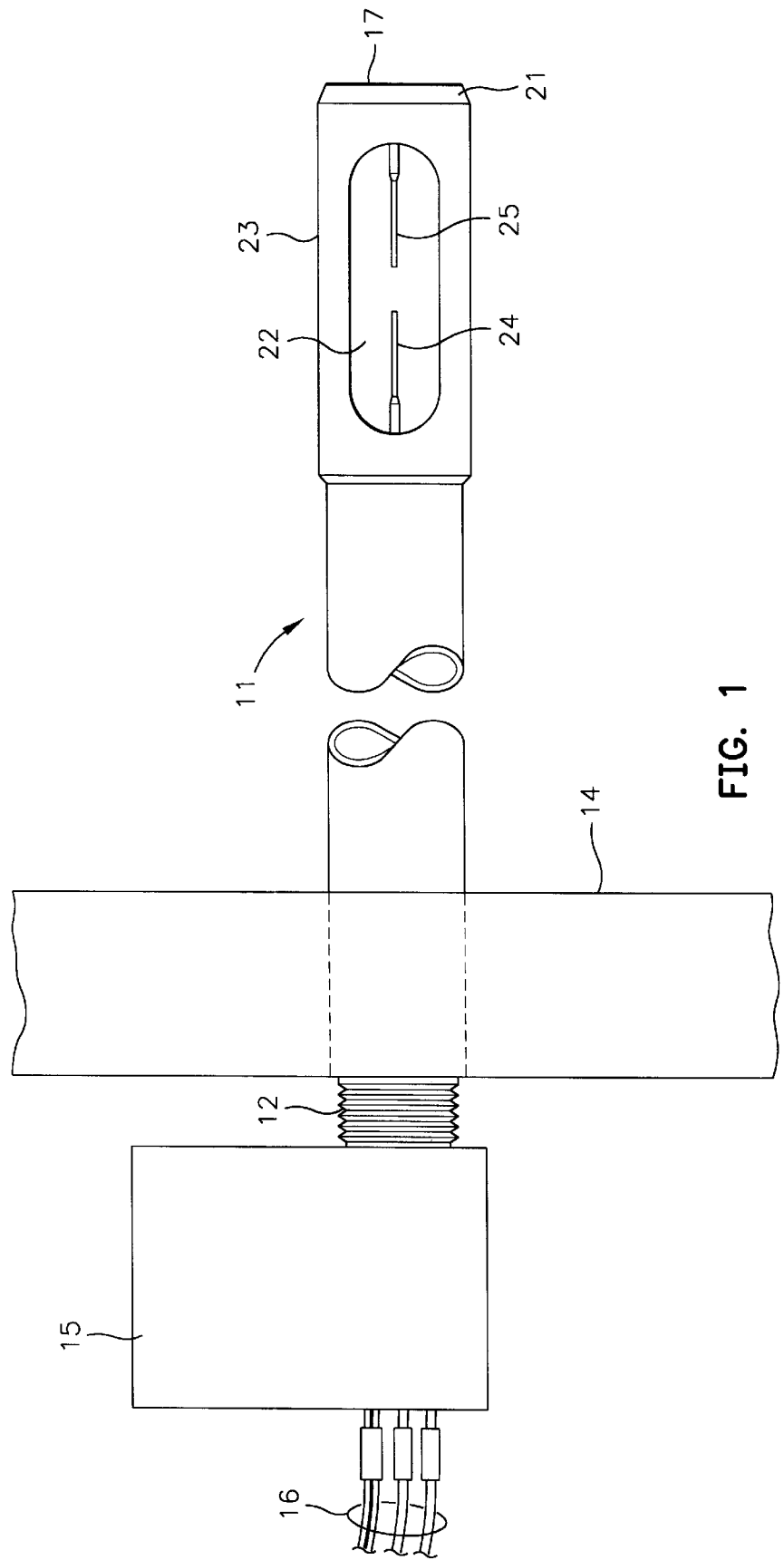

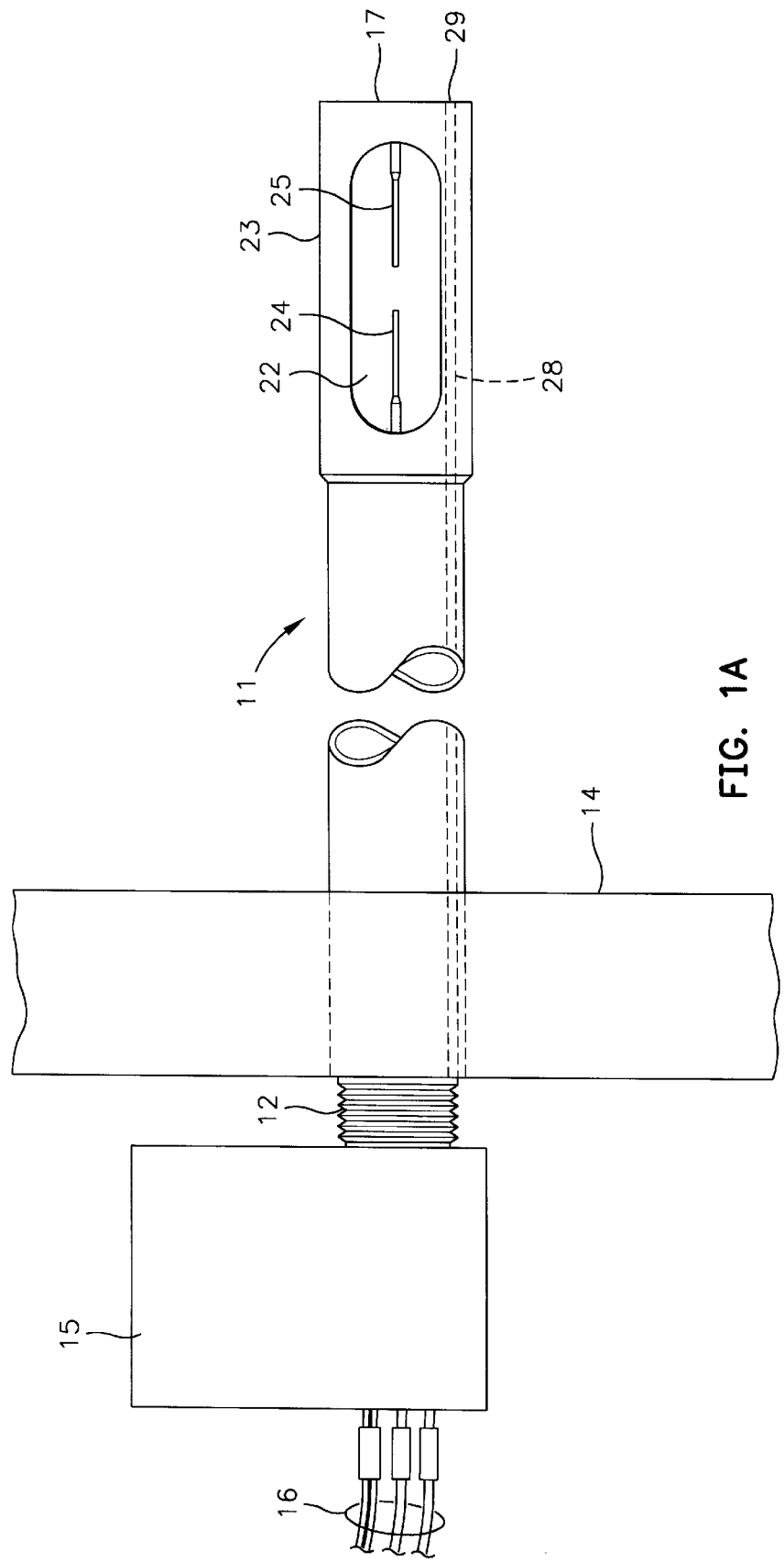

PRESSURE COMPENSATED THERMAL FLOW METER

BACKGROUND

1. Field of the Invention

This invention relates generally to mass flow sensors and more particularly to a thermal dispersion mass flow meter employing resistance temperature detection elements coupled with a pressure transducer for refining the mass flow determined by the thermal sensors in accordance with relative pressure changes.

2. Discussion of the Related Art

Thermal dispersion mass flow meters are a common choice for flow metering devices in the commercial and industrial metering markets. A typical sensor element for use in such meters is the resistance temperature detector (RTD), the resistance of which is related to the temperature of the element itself. A typical sensor employs at least two RTD elements. One of them is referred to as a reference element and is normally unheated. The active RTD element is heated and the effect of mass flow on the heated element provides a measure of the flow velocity of the substance in the conduit being monitored. The density of the fluid, normally a gas, flowing across the active RTD is also a factor in the amount of heat dissipated from that RTD. In some measurement situations, fluid density will be a constant so it can easily be accounted for in the system.

Two different methods are commonly used in the thermal dispersion industry to determine the mass flow in a conduit. One is configured to maintain a constant temperature differential between the reference RTD and the active RTD. This method measures the voltage or current required to maintain the active RTD at a constant temperature above the reference RTD while heat is removed from the active RTD by way of the physical properties of the flowing fluid. The other method measures the voltage difference between the active and the reference RTD's while the active RTD is heated by a constant current or a constant power heat source. During this measurement, as with the other method, the active RTD loses heat by way of the physical properties of the flowing media.

There are many configurations of dispersion mass flow sensors, and more particularly, of heated RTD type sensors. An early such flow detector is shown in U.S. Pat. No. 3,366,942. This patent discloses a reference sensor, a heated or active sensor, and a separate heating element located closely adjacent the heated sensor element. The basic principal of operation of dispersion flow meters is discussed in this patent. A different configuration of a three-element thermal dispersion sensor is shown in U.S. Pat. No. 4,899,584. There are many other examples of detectors employing differential temperature sensors, some having three elements as described in the patents mentioned above, and some having two elements, where the active sensor has the heater integral therewith. Even a single element differential temperature sensor may be employed. The single element sensor works on a time sharing basis where it acts as a reference sensor part of the time and is then heated to act as the active sensor in relatively rapid succession.

Most of the known differential temperature sensors are configured with the reference and heated sensors arranged in parallel. They are mounted in the fluid conduit and project into the flow path as an insertion flow sensor. The sensor elements are positioned to permit unobstructed flow fluid past both the heated sensor and the reference sensor in such a way that one does not thermally influence the other. That means that the reference sensor must indeed be a reference with respect to the fluid being sensed without influence from the heat of the heated sensor or the fluid heated by the heated sensor.

It has been found that at low flow rates, approximately 1.5 feet per second (fps) or below, pressure changes within the conduit can make drastic differences in the mass flow rates determined by a thermal flow meter. For example, tests have shown that for an actual flow rate of about 1 fps, an increased pressure of 90 psi can cause an error in the thermal flow meter reading of more than 50%. Since there are practical instances where flow rates below 1.5 fps at elevated pressures must be determined with accuracy, conventional thermal mass flow meters have generally been insufficient for that purpose.

SUMMARY OF THE INVENTION

Broadly speaking, the present invention provides a flow meter employing a differential temperature sensor configuration with pressure compensation having high levels of sensor accuracy, sensitivity and repeatability at very low fluid flow rates.

In one exemplary embodiment, the sensor of this invention comprises a single opening through the flow element adjacent its distal end which is positioned within the fluid flow path within the conduit. A reference sensor element projects into the opening from one wall and an active sensor element projects toward the reference sensor element from the opposite wall of the opening. The sensors are located on the longitudinal axis of the flow element. The opening is placed in the center of fluid flow in the conduit being monitored in order to have the most representative fluid flow over the sensor elements. The pressure transducer is mounted on the distal end of the flow element. However, a remote opening, or pressure tap, could be used to conduct the pressure from the vicinity of the sensor elements to the pressure transducer located outside of the conduit.

In a modification of this exemplary embodiment, a flow conditioner is employed to induce turbulence in a predictable way to enhance the accuracy of the readings provided by the active sensor element of the invention.

In an alternative embodiment, a conventional two element thermal sensor is modified by adding a pressure transducer in any one of several appropriate configurations.

The common aspect of the invention is that a thermal flow meter can be made more sensitive and accurate at low flow rates, where the pressure in the conduit can vary, by adding a pressure transducer and modifying the flow rate determined by the thermal flow meter to compensate for pressure changes from a calibrated or reference pressure. Appropriate computation and processing is accomplished so that the fluid flow reading from the meter is highly accurate.

BRIEF DESCRIPTION OF THE DRAWING

The objects, advantages and features of this invention will be more clearly perceived from the following detailed description, when read in conjunction with the accompanying drawing, in which:

FIG. 1 shows a plan view of a differential temperature sensor with a pressure transducer for mass flow metering in accordance with one embodiment of this invention;

FIG. 1A is an alternative embodiment of the pressure sensor of the invention of FIG. 1

DETAILED DESCRIPTION OF THE PREFERRED EMBODIMENTS

Figure 1B:
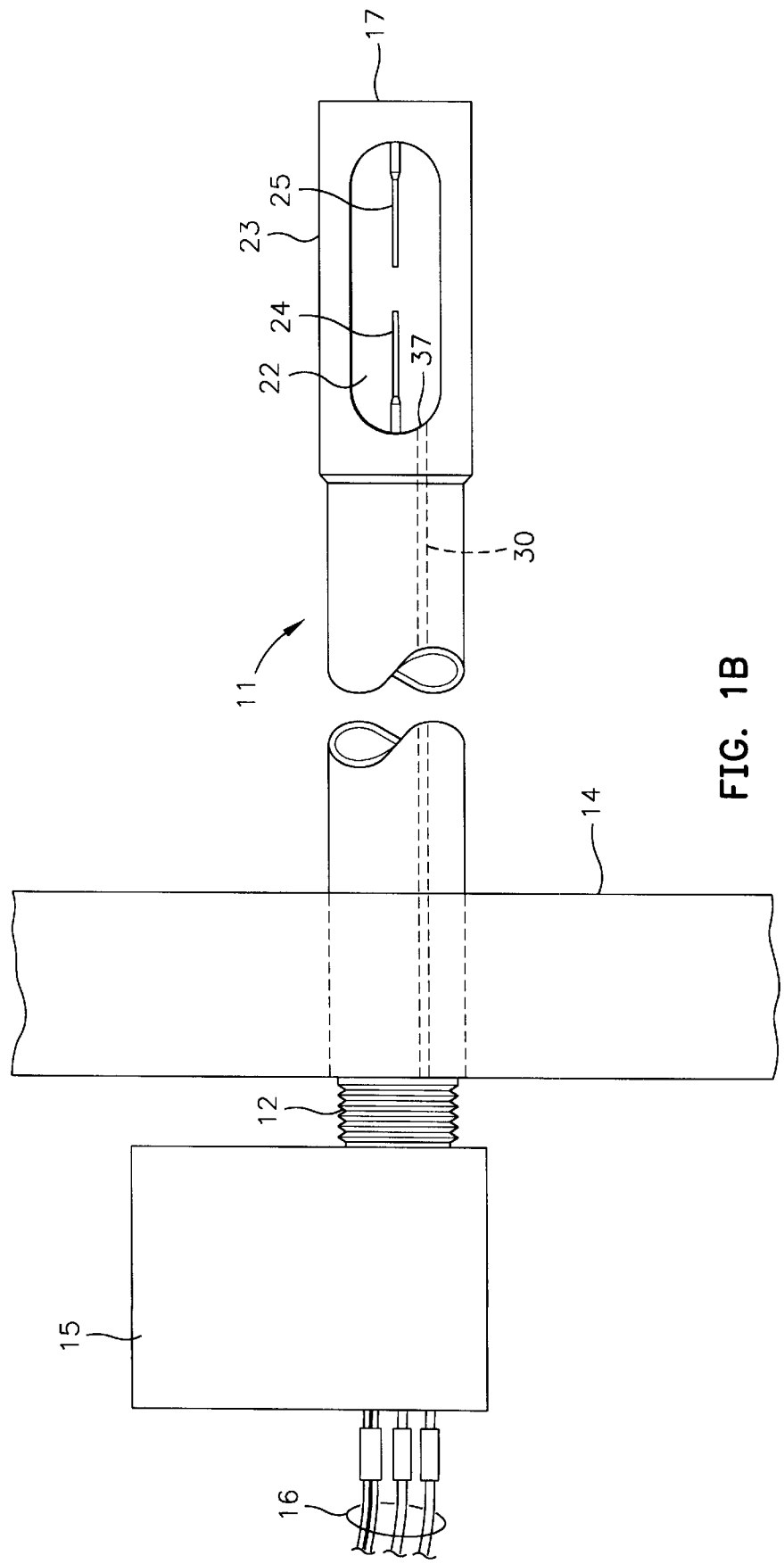
FIG. 1B is an alternative embodiment of the FIG. 1A pressure sensor.
Figure 2:
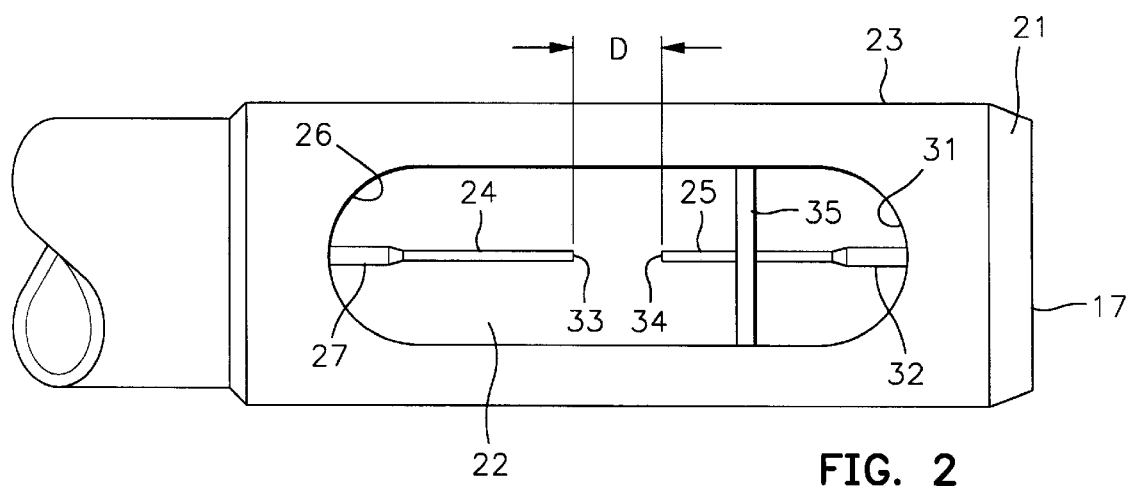
FIG. 2 is a modified enlarged plan view of the sensor head of FIG. 1.

With reference now to the drawing, and more particularly to FIGS. 1 and 2, examples of the invention are shown. Probe or flow element 11 is adapted to be connected in the wall of a conduit by appropriate means, such as threads, adaptors, or couplers, for example. Wall 14 and electronics housing 15 are shown as an example but their respective shapes, means of connection and locations may be different. Wires 16 provide external connections as required for signal processing and for applying power to heat the active or heated sensor. The length of flow element 11 from wall 14 to distal end 17 can be any length for the desired use. At the distal end of flow element 11 is pressure transducer 21. In opening 22 through head 23 are reference sensor 24 and active sensor 25. It is anticipated that the sensor probe of FIG. 1 will be used in pipes or conduits with a diameter as small as two inches, in which case the probe would be just slightly longer than one inch.

Preferred embodiments, at least under high temperature conditions which are above appropriate temperatures for proper operation of pressure transducer 21, are shown in FIGS. 1A and 1B. The actual pressure transducer is located in housing 15 and a pressure tap, or static pressure opening, is provided on probe 11. In FIG. 1A, the pressure tap comprises a tube or conduit 28 leading from opening 29 in distal end 17 of the probe to the transducer in housing 15. In FIG. 1B, the pressure tap comprises a tube or conduit 30 leading from opening 37 in opening 22. The basic requirement is that the pressure tap opening (29, 37) be positioned perpendicular to the fluid flow through the conduit in which probe 11 is mounted. If it were other than perpendicular the fluid flow would have a direct influence on the detected pressure.

Head 23 of flow element 11 is shown in greater detail in the modified version of FIG. 2. Reference sensor 24 is connected in end wall 26 of opening 22 by means of tube or mount 27. Active sensor 25 is connected in wall 31 by means of tube or mount 32 in such a way that the distance D between ends 33, 34 of sensors 24 and 25 ranges between about 0.30 and 1.00 inch. The preferred embodiment is about 0.30 inch, as will be more fully discussed below. For the embodiment provided as an example here, the length of sensor elements 24 and 25 extending beyond their respective mounts 27 and 32 is about 0.4 inch. The length of mounts 27, 32 is about 0.22 inch. Sensor elements 24 and 25 are preferably on the axis of probe 11 so that if the probe is not mounted with the direction of primary fluid flow exactly parallel to the walls of opening 22 through head 23, there will be no degradation of the accuracy of the signals provided by the sensors. Because they are on the axis, rotation by as much as five degrees of the sensor head will not adversely affect the accuracy of the readings provided by the sensors. It can be appreciated that if the sensor elements were themselves coaxial but not on the sensor axis, the sides of opening 22 could act as a baffle and affect the readings. Alternatively, if the sensor elements were not coaxial, a slight rotation of head 23 could make a substantial difference in the flow characteristics of the fluid reaching the sensor elements. With even a few degrees of rotation, the non-coaxial sensor elements would be in different positions with respect to the flow direction, causing inaccuracies in the precision of the readings.

It is preferred that the minimum gap D between ends 33 and 34 of the sensor elements be at least 0.30 inch because if they were closer, inaccuracies due to convective heating from the heated element to the reference element could occur, especially at low flow rates (in the range of one fps, for example). It is also preferred that the gap between ends 33 and 34 not exceed about one inch because a larger difference could result in different flow characteristics over each element, just based upon the large spacing and the fact that gas flow is not constant over any appreciable cross-section of the conduit in which flow occurs. Also for dimensional purposes, since flow element 11 and head 23 can be mounted in a conduit having a diameter as small as two inches, the dimensions set forth in this example can accommodate a conduit of that small size. In a two-inch conduit, it is important that the center of distance D between probe ends 33 and 34 be as precisely as possible in the center of the conduit. This is because the center flow and the equal distance on either side of that flow which can be sensed by sensor elements with the dimensions given, is most representative of the gas flow in the conduit. If the sensor head shown in FIG. 2 is mounted in a larger conduit, for example, ranging between three and ten inches in diameter (or across, for non-cylindrical conduits), the position of the center point between sensor ends 33 and 34 could vary by about 1% from the center for a three-inch duct and as much as about 5% from center in a ten-inch duct. That is to say, the center of the gap between the sensor elements should be as close as possible to the center of the fluid flow conduit but some tolerance is permissible.

Further dimensions for the exemplary embodiment of FIG. 2 are that opening 22 would be approximately 0.5 inch wide and the distance between end walls 26 and 31 would be approximately 1.54 inch. Again, this exemplary set of parameters is for the preferred embodiment of the invention. However, a larger or possibly somewhat smaller embodiment of head 23 could be structured but the ratios of the relative length of the sensor elements and their mounts, together with the gap between them, and the opening in which they are mounted, should be relatively consistent with the example given. While opening 22 in head 23 is shown as an elongated oval, the actual shape is a matter of fabrication convenience. For a relatively large conduit, it is possible that opening 22 could be round rather than elongated, because the large conduit could accommodate a larger flow element head. The important thing is that the diameter of head 23 be as small as possible, that the distance between opposing top and bottom walls (with reference to the FIG. 2 orientation) of opening 22 be at least about 0.5 inch and that end walls 26 and 31 be axially spaced a sufficient distance to enable sensor elements, their mounts, their mounting means and the gap between the sensor elements to exist within the relative dimensions given. The body of flow element 11, for the exemplary embodiment described, is preferably about 0.75 inch in diameter, while head 23 is preferably about 0.875 inch in diameter. The diameter of sensors 24 and 25 is preferably about 0.050 inch and mounts 27 and 32 are about 0.70 inch in diameter.

The preferred embodiment of the sensor of FIG. 2 includes turbulence inducer 35 which is positioned substantially normal to the axial orientation of active sensor 25 and is spaced upstream within opening 22 by at least about 0.30 inch and preferably no more than about 0.50 inch. The turbulence inducer is referred to as a flow conditioner. If it were positioned any closer to active element 25 than about 0.30 inch, conditioned flow would not be able to be developed by the time the gas encounters the sensor. On the other hand, if the turbulence inducer is spaced more than about 0.50 inch upstream from sensor element 25, it could allow turbulence in the line to creep around the turbulence inducer, thereby reducing its effectiveness and permitting non-conditioned flow to encounter the sensor element, thereby degrading the accuracy of the sensor readings. For a sensor having the dimensions of the examples given above, turbulence inducer 35 could be a wire and should have a cross-section ranging between about 0.062 and 0.093 inch.

The turbulence inducer should be positioned as close as possible to the center of the length of active sensor 25 between mount 32 and end 34. The purpose is to condition the flow of the gas being sensed so that the turbulence is consistent as it passes over the active sensor. By centering turbulence inducer 35 on the length of the active sensor, the flow around the turbulence inducer and then immediately encountering active sensor 25 will be equal and constant over the entire length of the active sensor. It has been found that a turbulence inducer element smaller than about 0.062 inch in cross-section would not create the amount of turbulence necessary to ensure accurate readings by the sensor. On the other hand, if the cross-section of the turbulence inducer is greater than about 0.093 inch it would cause too much turbulence and would effectively block or shade too great a portion of the length of sensor 25. Not only would the turbulence created by a larger turbulence inducer element be greater than desired, it could be inconsistent, and thereby degrade from the desired precision of the sensor readings. Stated another way, the ratio of the length of sensor 25 to the diameter of turbulence inducer 35 should be at least about 4:1. This ensures that the fluid flow is conditioned while at the same time a minimal amount of the length of the active sensor is shaded by the turbulence inducer. For larger conduits to be monitored, where a larger flow element may be used, all of the above dimensions could be different, but the relative sizes hold true.

In the FIG. 1 embodiment, pressure transducer 21 may be a conventional device and can be any suitable pressure sensitive element which can fit on or in the end of flow element 11 without adversely affecting the flow characteristics of the fluid in the conduit. The transducer itself may be mounted in housing 15 as explained previously. It is preferred that the pressure transducer or pressure tap be located near the thermal sensor elements so it provides accurate indications of pressure changes in the same general vicinity as the location of the thermal sensors. In its simplest form, the pressure transducer comprises a pressure sensitive resistive element configured as one leg of a Wheatstone bridge. The output of the bridge is zero at calibration or reference pressure, and changes either plus or minus, depending upon whether the pressure increases or decreases from the reference pressure.

Figure 8:
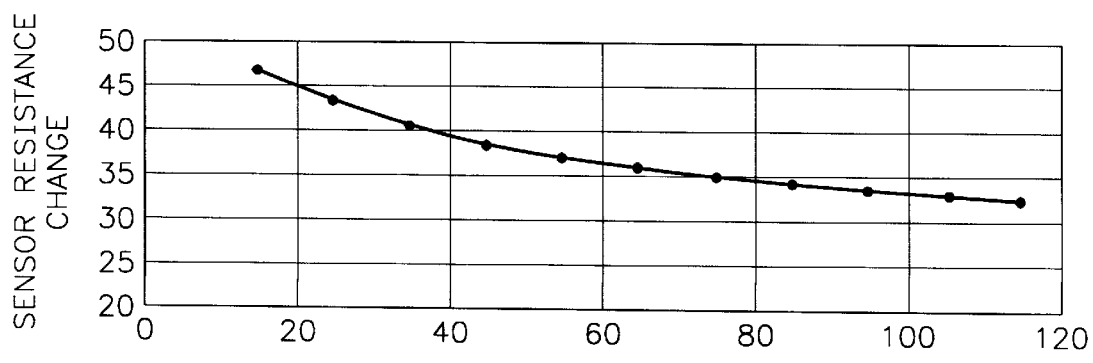
FIG. 8 is a graph showing the relationship of changes in heat dissipation of the active sensor with pressure changes.

The relative effects of pressure changes on the heat dissipated by the active sensor are shown in FIG. 8. It can be seen that as pressure increases, the sensor resistance change decreases, which needs to be compensated for. That is a primary objective of this invention.

Figure 3:
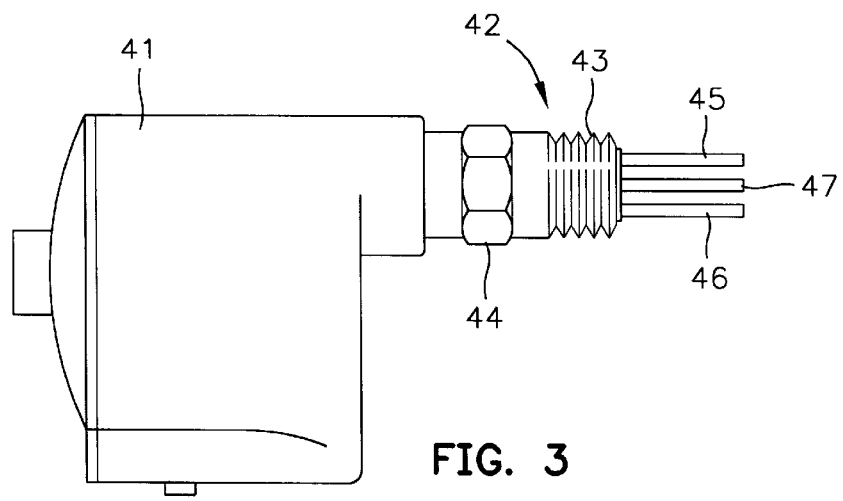
FIG. 3 shows an alternative embodiment of the invention.
Figure 4:
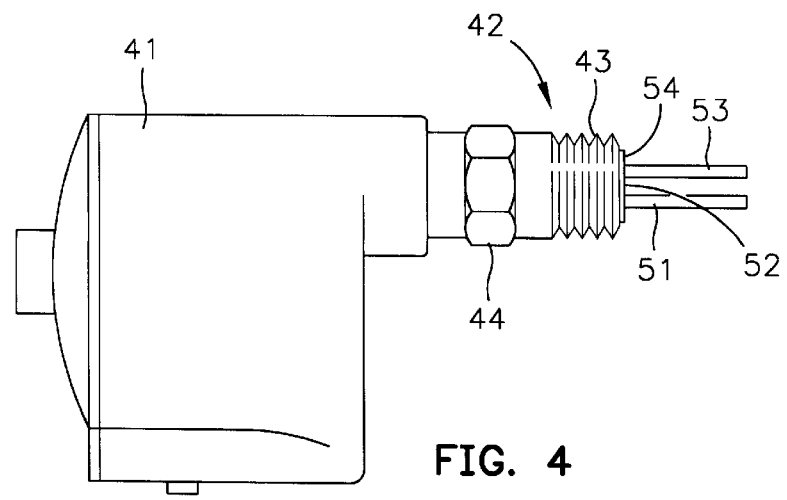
FIG. 4 is a modification of the embodiment of FIG. 3.

Alternative embodiments of the invention are shown in FIGS. 3 and 4. Electronics housing 41 extends outwardly from the fluid flow conduit in which flow element 42 is mounted. Head 43 may be threaded into the wall of the conduit, with hex-shaped portion 44 provided for employing a wrench to mount the unit to the conduit. Extending into the fluid flow path are reference sensor element 45, active sensor element 46 and pressure transducer element 47. A pressure tap, as shown in FIGS. 1A or 1B, could be used here in place of transducer 47. The reference sensor would normally include a resistance temperature detector (RTD) or equivalent element, as would the active sensor. However, the active sensor would also include some means to heat the sensor element so that there is heat to be dissipated by the flowing fluid. In this embodiment the pressure transducer is mounted on a separate probe.

In the FIG. 4 embodiment, reference sensor 51 and active sensor 53 are essentially the same as the sensor elements in FIG. 3. Pressure transducer or pressure tap 52 may be mounted on or extend toward housing 41 from surface 52 from which sensors 51 and 53 extend.

Figure 5:
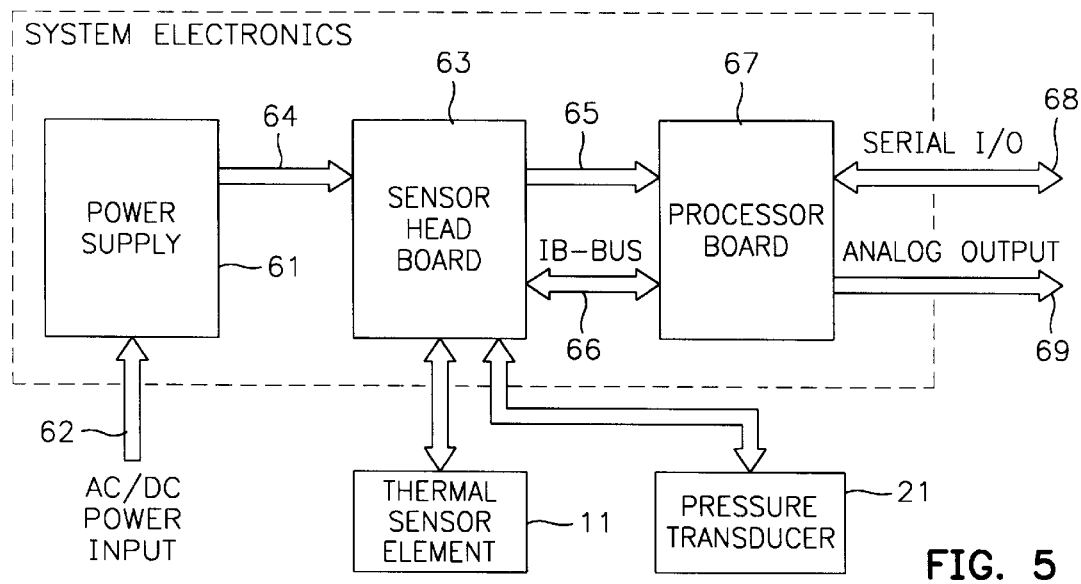
FIG. 5 is a basic block diagram of the electronics to which the sensor of the invention is connected and which provide the signal processing of the sensor outputs.
Figure 6:
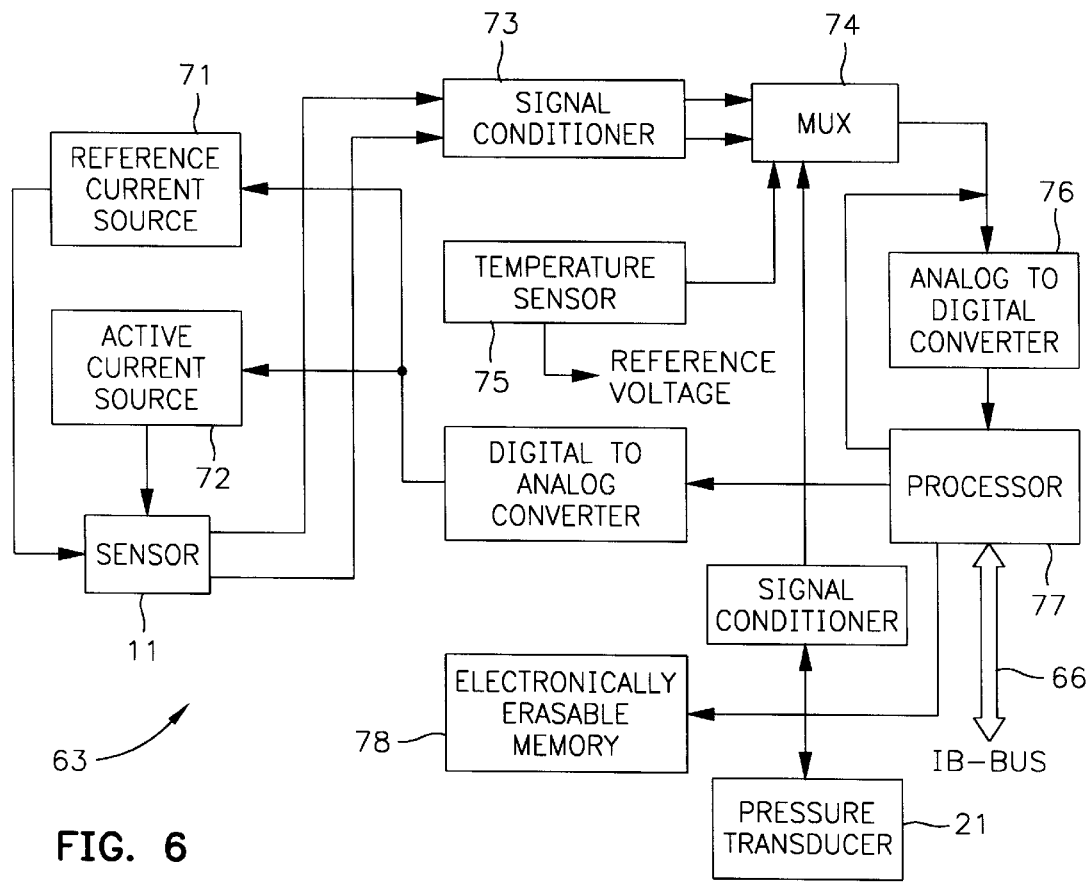
FIG. 6 is a more detailed block diagram of the sensor head board of FIG. 5.
Figure 7:
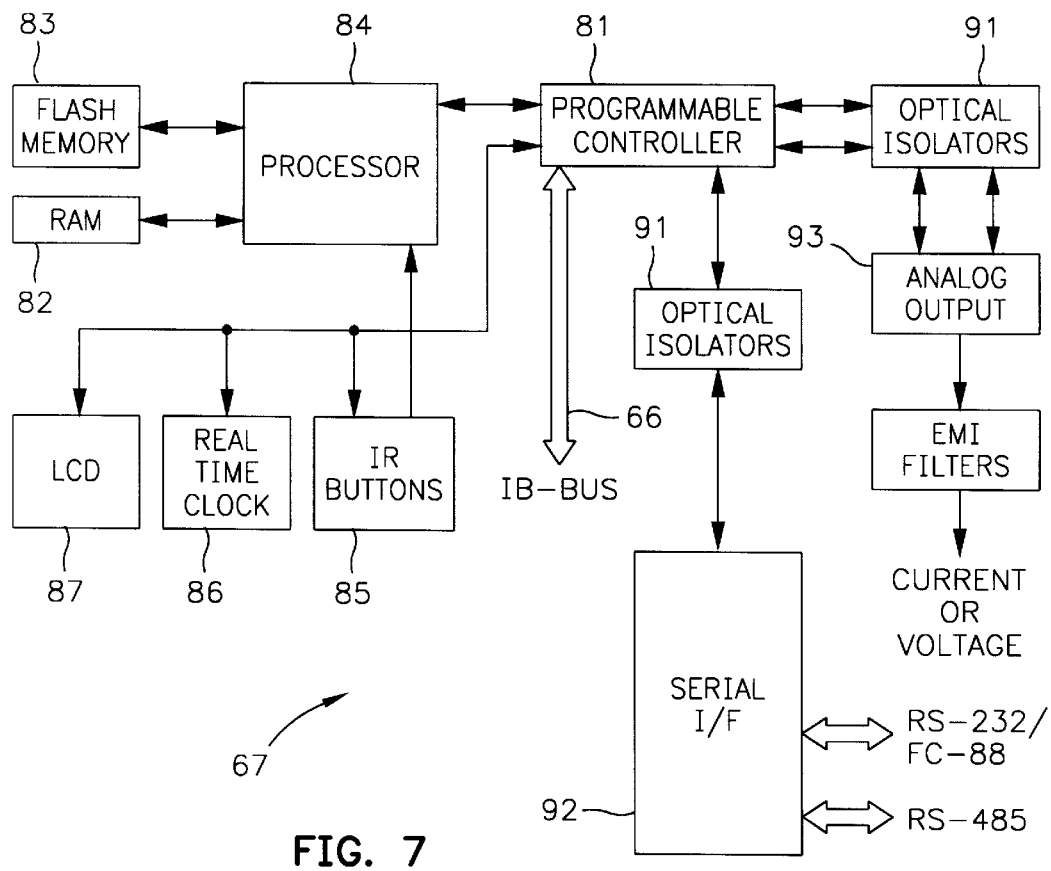
FIG. 7 is a more detailed block diagram of the processor board of FIG. 5.

For purposes of completeness, appropriate electronic circuitry appears in FIGS. 5–7 in block diagram form. This circuitry could be positioned immediately outside the conduit and connected to the end of the probe which extends through the wall of the conduit. Final processing would normally be conducted at a central location. Alternatively, all of the circuitry shown could be at a central, remote, location.

FIG. 5 shows a block diagram of the general case system electronics. Power supply 61 is powered by AC or DC input source power through line 62. Appropriate power and signals to sensor head board 63 are provided from the power supply through connection 64 and from the outputs of sensor 11 of FIG. 2. Input/output 66 from the sensor board supplies information to processor board 67. Line 65 provides power to the processor board. Pressure transducer 21, from FIGS. 1 and 2, provides an input to sensor head board 63. Bus 68 represents an input/output bus to the user's control station, normally a computer. Bus 69 provides an analog output from the processor for another aspect of user control. A person of ordinary skill in the signal processing field would readily understand the functions of these various blocks and how the sensor signals are to be handled to obtain the useful information for which the sensor is intended. However, further breakdown of the blocks of FIG. 5 are provided in FIGS. 6 and 7 in order to further detail some of the ways in which the sensor signals are processed for useful information. It is to be understood that the invention primarily relates to the improvements in the flow element structure itself, with the addition of the pressure transducer, and its ability to obtain accurate signals representative of flow characteristics, even at very low flow rates, adjusted for pressure changes.

Sensor head board 63, likely mounted in a housing immediately adjacent the conduit into which sensor 11 projects, such as housing 15 through conduit wall 14 of FIG. 1, is shown in more detail in FIG. 6. Sensor 11 has current inputs from reference sensor current source 71 and active sensor current source 72. The sensor outputs are coupled to signal conditioner 73 and then to multiplexer (MUX) 74 where the output of temperature sensor 75 is combined with the conditioned sensor signals. The temperatures recorded are for the inside of the electronics housing, and temperatures in the conduit or sensor itself. The sensor signals are then converted to digital form in A/D converter 76 and processed in processor 77. EE memory 78 stores set up and calibration data. The output signal from pressure transducer 21 is also input through MUX 74.

Processor board 67 is shown in more detail in FIG. 7. Processor 77 in board 63 and programmable controller 81 in board 67 are interconnected by interboard (IB) bus 66. RAM 82 and flash memory 83 provide program memory for processor 84. Operator control and adjustment IR buttons 85 and real time clock 86 provide appropriate control and time information to processor 84. LCD 87 is a readout for the sensor readings. Optical isolators 91 provide safety features for board 67. Serial interface 92 provides the interface between the RS-232 and RS-485 buses and the rest of board 67. The RS buses couple an external computer to the sensor electronics for communication therebetween. Analog output 93 provides signals for user control purposes.

The boards described above employ conventional off-the-shelf components. Their functions are straightforward and well known to those of ordinary skill in the relevant area of technology.

In view of the description above, it is likely that modifications and improvements will occur to those skilled in the relevant technical field. It is to be understood that the invention is limited only by the spirit and scope of the accompanying claims.

What is claimed is:

1. A thermal fluid flow sensor for determining mass flow of a fluid in a conduit, said conduit having a wall, said sensor comprising:

a flow element having a distal end configured to project through said conduit wall into the conduit;

a reference sensor on said distal end of said flow element, said reference sensor having an output signal related in value to the temperature of the flowing fluid;

an active sensor on said distal end of said flow element, said active sensor being heated and having an output signal related in value to the velocity of flow of the fluid, resulting in heat dissipation from said active sensor;

a pressure sensing element coupled to said flow element, said pressure sensing element having an output signal related to the relative pressure in said conduit; and computation and processing means for modifying the compared output signals of said reference sensor and said active sensor in accordance with the relative pressure in said conduit.

2. The sensor recited in claim 1, wherein said pressure sensing element comprises a pressure transducer on said distal end of said flow element.

3. The sensor of claim 1, where said pressure sensor element comprises a pressure transducer coupled to said flow element.

4. The sensor recited in claim 3, wherein said pressure sensing element comprises a pressure tap opening on said distal end of said flow element, said pressure tap communicating the pressure at said distal end to said pressure transducer.

5. The sensor recited in claim 1, and further comprising a turbulence inducing element secured to said distal end of said flow element in a manner to cause consistent turbulent fluid flow on said active sensor.

6. A method of sensing mass flow of fluid in a conduit, the method comprising the steps of:

preparing an insertion sensor having a reference sensor element, a heated active sensor element and a pressure sensor element therein and electrical connections;

forming an opening in a side wall of the conduit;

inserting the insertion sensor comprising the sensor elements through the opening and mounting the sensor to the side wall of the conduit so that the sensor elements are within the conduit;

determining mass flow of the fluid in the conduit by comparing the signals from the reference sensor and the active sensor; and modifying the mass flow value in accordance with the relative pressure change sensed by the pressure sensor element.

7. A thermal fluid flow meter for determining mass flow of a flowing fluid, the meter comprising:

a reference sensor having an output signal related in value to the temperature of the flowing fluid;

a heated active sensor having an output signal related in value to the velocity of flow of the flowing fluid, with the output signal of the active sensor being based on heat dissipated from the active sensor;

a pressure sensing element having an output signal related to a pressure of the flowing fluid; and a computation element structured to determine the mass flow of the flowing fluid based on the output signals of the reference sensor, the active sensor and the pressure sensing element.

8. The thermal fluid flow sensor according to claim 7, wherein the output signal of the pressure sensing element related to a static pressure of the flowing fluid.

9. The thermal fluid flow sensor according to claim 7, wherein the output signal of the pressure sensing element related to a relative pressure of the flowing fluid.

10. The thermal fluid flow sensor according to claim 7, wherein the computation element is structured to determine an uncorrected mass flow rate based on the output signals of the reference sensor and the active sensor and to determine a corrected mass flow rate by modifying the uncorrected mass flow rate based on the difference between the output signal of the pressure sensing element and a reference pressure value.

* * * * *